UNITED STATES PATENT OFFICE.

WALTER KAEMPFE, OF GROSSENHAIN, GERMANY.

PROCESS FOR THE MANUFACTURE OF POLYMERIZED PRODUCTS FROM ANIMAL OILS.

1,122,400.    Specification of Letters Patent.    Patented Dec. 29, 1914.

No Drawing. Original application filed April 8, 1913, Serial No. 759,795. Divided and this application filed September 30, 1913. Serial No. 792,629.

*To all whom it may concern:*

Be it known that I, WALTER KAEMPFE, a subject of the German Emperor, and residing at Grossenhain, in Saxony, Germany, have invented a certain new and useful Improved Process for the Manufacture of Polymerized Products from Animal Oils, of which the following is a specification.

This invention relates to the production of polymerized products from animal oils.

The object of the invention is to provide an improved process of the type in which an animal oil, for example fish oil, train oil or the like, for the purpose of obtaining polymerized products, is fractionally hydrolyzed and distilled. A known process of this type devised by the present applicant is carried out broadly in the following manner:—The oil is heated in a retort for several hours to 235° to 240° C. and then steam at a temperature of 385° to 400° C. is blown through the retort. During the passage of steam through the retort the glycerids of the saturated fatty acids are hydrolyzed and their components distil off and the glycerids of the unsaturated fatty acids polymerize, but care has to be taken that during this process the temperature is not allowed to rise much above 260° to 285°, for it has been found that above this temperature the unsaturated glycerids are liable to be decomposed. The duration of this latter process varied according to the iodin number of the oil, being between say 20 to 30 hours.

The invention consists, broadly, in effecting the fractional hydrolysis by heating the oil with water under pressure.

The invention further consists in facilitating the hydrolysis by adding to the reaction mixture a proportion of an oxid, hydroxid or carbonate of an alkaline earth metal or manganese sulfate, such materials being hereinafter referred to as inorganic agents promoting hydrolysis and polymerization. The polymerized products obtained are particularly adapted for use as linseed oil varnish substitutes and they may be had of various degrees of viscosity.

In carrying the invention into effect, to the oil under treatment, a proportion of water equivalent for example, to from 10 to 50 per cent. of the weight of the oil is added; 15 per cent. is, as a rule, a convenient proportion. The mixture is then heated in an autoclave, the duration of this treatment varying with the pressure employed. It is generally advantageous to add to the mixture of oil and water a proportion of a material capable of aiding the hydrolytic process; for example, a proportion of lime, or the oxid, hydroxid or carbonate of an alkaline earth metal or manganese sulfate. The pressure to which the material is submitted in the autoclave depends upon the proportion and nature of the catalytic substance added to the mixture. With a pressure of 10 atmospheres, a proportion of manganese sulfate equivalent to ½ per cent. by weight is required. The duration of the treatment in the autoclave also depends upon the pressure employed. At a pressure of 30 atmospheres, one hour's treatment generally suffices to effect the hydrolysis of the glycerids of the saturated fatty acids and of the glycerids of the unsaturated fatty acids having one double bond; at a pressure of 15 atmospheres, 1½ hours is sufficient and at 10 atmospheres, 3½ to 4 hours. On the termination of the treatment in the autoclave, when the mass has become cooled, for example, to 10° C. a proportion of certain of the fatty acids crystallizes out and they may be separated by known means. This separation is however, not essential. The liquid fatty acids and the solid fatty acids contained in the mixture are removed from the oily product by distillation with superheated steam at a temperature of, for example, 375° C. The duration of this distillation may be 4 to 6 hours. A lower temperature may, however, be employed, for example, 220° C. as certain fatty acids distil under these circumstances. The lower the pressure employed the more liquid is the varnish substitute produced; for the reduction of the pressure is accompanied by reduction in the degree of polymerization. The glycerin formed by the hydrolysis may be obtained by extracting the mass from the autoclave either before or after separating the fatty acids, solid at ordinary temperatures, for example, palmitic and stearic acid by cooling. The glycerin may then be obtained from the aqueous extract by known means.

Having now described my invention, what I claim as new and desire to secure by Letters Patent is:—

1. The process for the production of polymerized products from animal oils which comprises hydrolyzing the more easily hydrolyzed glycerids in the oil by heating with water at a pressure above atmospheric pressure, separating out the hydrolyzed products and polymerizing the residue.

2. The process for the production of polymerized products from animal oils, which comprises hydrolyzing the more easily hydrolyzed glycerids contained in the oil by heating with water at a pressure above atmospheric pressure, separating out the hydrolyzed products and polymerizing the residue with the aid of heat.

3. The process for the production of polymerized products from animal oils, which comprises hydrolyzing the more easily hydrolyzed glycerids contained in the oil by heating with water at a pressure above atmospheric pressure, separating out the hydrolyzed products and polymerizing the residue with the aid of superheated steam.

4. The process for the production of polymerized products from animal oils which comprises hydrolyzing the more easily hydrolyzed glycerids contained in the oil by heating with water at a pressure above atmospheric pressure and in the presence of an inorganic agent promoting hydrolysis and polymerization, separating out the hydrolyzed products and polymerizing the residue with the aid of heat.

5. The process for the production of polymerized products from animal oils which comprises hydrolyzing the more easily hydrolyzed glycerids contained in the oil by heating with water at a pressure above atmospheric pressure and in the presence of manganese sulfate and polymerizing the residue.

6. The process for the production of polymerized products from animal oils which comprises hydrolyzing the more easily hydrolyzed glycerids contained in the oil by heating with water at a pressure above atmospheric pressure, separating the hydrolyzed products and polymerizing the residue.

7. The process for the production of polymerized products from animal oils which comprises hydrolyzing the more easily hydrolyzed glycerids contained in the oil by heating with water at a pressure above atmospheric pressure and in the presence of manganese sulfate, separating the hydrolyzed products and polymerizing the residue.

8. The process for the production of polymerized products from animal oils which comprises fractionally hydrolyzing the oil by heating with water at a pressure of from 10 to 30 atmospheres, separating the hydrolyzed products and polymerizing the residue.

9. The process for the production of polymerized products from animal oils which comprises fractionally hydrolyzing the oil by heating with water at a pressure of from 10 to 30 atmospheres and in the pressure of manganese sulfate, separating the hydrolyzed products and polymerizing the residue with the aid of superheated steam.

10. The process for the production of polymerized products from animal oils which comprises fractionally hydrolyzing the oil by heating with water at a pressure above atmospheric pressure and in the presence of manganese sulfate, subsequently cooling the mass to 10° C., removing the solid fatty acids, and subjecting the remaining portion to distillation with superheated steam at a temperature of 375° C.

11. The process for the production of polymerized products from animal oils which comprises fractionally hydrolyzing the oil by heating with water at a pressure of from 10 to 30 atmospheres and in the presence of manganese sulfate, extracting the glycerin with the aid of water, cooling the mass to 10° C., removing the solid fatty acids and subjecting the remaining portion to distillation with the aid of superheated steam.

In testimony whereof I affix my signature in presence of two witnesses.

WALTER KAEMPFE.

Witnesses:
 PAUL ARRAS,
 CLARE SIMON.